United States Patent
Kumar et al.

(10) Patent No.: US 12,141,154 B2
(45) Date of Patent: Nov. 12, 2024

(54) DATASET RANKING BASED ON COMPOSITE SCORE

(71) Applicant: Intuit Inc., Mountain View, CA (US)

(72) Inventors: Sricharan Kallur Palli Kumar, Mountain View, CA (US); Ashok N. Srivastava, Mountain View, CA (US); Tristan Cooper Baker, San Diego, CA (US); Alon Amit, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/072,697

(22) Filed: Nov. 30, 2022

(65) Prior Publication Data

US 2024/0176788 A1    May 30, 2024

(51) Int. Cl.
*G06F 16/2457* (2019.01)
*G06F 16/901* (2019.01)

(52) U.S. Cl.
CPC .... *G06F 16/24578* (2019.01); *G06F 16/9024* (2019.01)

(58) Field of Classification Search
CPC ........................ G06F 16/24578; G06F 16/9024
USPC ......................................................... 707/723
See application file for complete search history.

(56) References Cited

U.S. PATENT DOCUMENTS

| | | | | |
|---|---|---|---|---|
| 8,661,029 B1 * | 2/2014 | Kim | ................ | G06F 16/24578 |
| | | | | 707/723 |
| 8,982,129 B1 * | 3/2015 | Broekhuijsen | ...... | G06F 16/9024 |
| | | | | 707/736 |
| 2011/0035353 A1 * | 2/2011 | Bailey | ................ | G06F 16/283 |
| | | | | 707/E17.014 |
| 2011/0184896 A1 * | 7/2011 | Guyon | ................ | G16B 25/10 |
| | | | | 706/12 |
| 2014/0278986 A1 * | 9/2014 | Rouse | ................ | G06F 16/9535 |
| | | | | 705/14.54 |
| 2016/0117413 A1 * | 4/2016 | Botea | ................ | G06F 16/28 |
| | | | | 707/749 |
| 2016/0328406 A1 * | 11/2016 | Convertino | ......... | G06F 16/9535 |
| 2017/0154124 A1 * | 6/2017 | Singh | ................ | G06F 16/248 |
| 2017/0228435 A1 * | 8/2017 | Tacchi | ................ | G06F 16/9024 |
| 2018/0096077 A1 * | 4/2018 | Srivastava | .......... | G06F 16/2457 |
| 2018/0239763 A1 * | 8/2018 | Majumdar | ............. | G06N 20/20 |

(Continued)

OTHER PUBLICATIONS

Brin, S., et al., "The Anatomy of a Large-Scale Hypertextual Web Search Engine", Computer Networks and ISDN Systems, Apr. 1, 1998, 11 pages.

*Primary Examiner* — Mark E Hershley
*Assistant Examiner* — Antonio J Caiado
(74) *Attorney, Agent, or Firm* — Lathrop GPM LLP (57) ABSTRACT

A method implements a dataset rank metric for measuring dataset relevance. Metadata is identified for a plurality of datasets. A graph structure is generated in storage. The graph structure includes a multitude of nodes connected by a multitude of edges. Each node of the multitude of nodes representing a respective dataset of a multitude of datasets, the multitude of edges connecting the multitude of nodes according to a data lineage determined from metadata of the multitude of datasets. A composite score is generated for each node of the graph. The computer processor iteratively processes the composite scores for the multitude of nodes of the graph to generate a dataset rank for each dataset. The multitude of datasets is presented in an interface, sorted according to the respective dataset rank of each dataset.

20 Claims, 4 Drawing Sheets

(56) References Cited

U.S. PATENT DOCUMENTS

| | | | |
|---|---|---|---|
| 2019/0164082 A1* | 5/2019 | Wu | G06N 20/00 |
| 2019/0188308 A1* | 6/2019 | Simon | G06F 16/219 |
| 2019/0236740 A1* | 8/2019 | Rao | G06N 20/20 |
| 2019/0324989 A1* | 10/2019 | Borochoff | G06F 16/282 |
| 2020/0118036 A1* | 4/2020 | Karnagel | G06N 3/088 |
| 2020/0151608 A1* | 5/2020 | Bhowan | G06F 16/9024 |
| 2021/0256032 A1* | 8/2021 | Burbank | G06F 16/906 |
| 2021/0289033 A1* | 9/2021 | Ahuja | H04L 63/126 |
| 2021/0303635 A1* | 9/2021 | Mostafa | G06F 40/56 |
| 2021/0334254 A1* | 10/2021 | Thompson | G06F 16/168 |
| 2022/0179909 A1* | 6/2022 | Bender | G06F 16/24578 |
| 2024/0118867 A1* | 4/2024 | Qi | G06F 7/14 |

\* cited by examiner

DATASET RANKING BASED ON COMPOSITE SCORE

BACKGROUND

Businesses collect huge amounts of data on their customers, markets, suppliers, and production processes. A myriad of different applications and systems generate data that flows in from online and traditional transactions systems, sensors, social media, mobile devices, and other diverse sources, where it is stored in a data lake for consumption.

Data discovery and exploration are the processes for collecting evaluating, and analyzing this data to generate useful analytics. Data discovery includes connecting multiple data sources, cleansing, and preparing the data, sharing the data throughout the organization. Data exploration, enabled by various machine learning platforms and pattern recognition software, performing analysis of the data to gain insights into business processes.

In many contexts, the challenge of data discovery inside the confines of a company's data center relies on simple text searching. These traditional information retrieval techniques can give poor results when searching larger data centers having highly variable content quality. In other words, the simple text searches that are typically employed to search for data so not scale when applied to the massive amounts of data typically generated in today's business environment.

For example, when searching data center for a particular search term, current data discovery methods tend to focus on metrics that are isolated to individual datasets. The results will return tables according to the number of times that search terms appear within those tables. Thus, when searching for data such as an invoice for company, thousands—sometimes tens of thousands—of results can be identified as relevant. Furthermore, if results are ranked, current data discovery methods use simple metrics, such as counting instances of a search term within a particular table. Without a clever ranking mechanism, users don't know where to start.

Web search results can be improved by using the information contained in the link structure between pages. For example, the PageRank algorithm, used in the Google search engine, greatly improves the results of Web search by considering the link structure of the Web. By counting the hyperlinks into and out of pages, PageRank considers not just the individual information or quality of any web page, but also the connections between the web pages to identify relevant and useful webpages. Unfortunately, tables do not generally contain hyperlinks, frustrating the applicability of the PageRank algorithm to datasets within a data center.

SUMMARY

In general, one or more aspects of the disclosure relates to a method implementing a dataset rank metric for identifying relevant datasets. The method includes identifying metadata for a plurality of datasets. The method further includes generating a graph that connects the plurality of datasets according to a data lineage determined from the metadata. A composite score is generated for each node of the graph, wherein each node represents a respective dataset in the plurality of datasets. The graph is iteratively processed to generate a dataset rank for each dataset. The method additionally includes presenting the plurality of datasets, sorted according to the respective dataset rank of each dataset.

In general, one or more aspects of the disclosure relates to a system implementing a dataset rank metric for identifying relevant datasets. The system includes a graph controller that is configured to process a plurality of datasets. An interface controller that is configured to generate a response comprising a plurality of dataset identifiers, additionally, the system includes a modeling application executing on one or more servers. The modeling application is configured for identifying metadata for a plurality of datasets. The modeling application is configured for generating a graph that connects the plurality of datasets according to a data lineage determined from the metadata. The modeling application is configured for generating a composite score for each node of the graph, wherein each node represents a respective dataset in the plurality of datasets. The modeling application is configured for iteratively processing the graph to generate a dataset rank for each dataset. The system further includes a server application, executing on one or more servers, configured for presenting the plurality of datasets that are sorted according to the respective dataset rank of each dataset.

In general, one or more aspects of the disclosure relates to a computer program product comprising non-transitory computer-readable program code. When executed by a computer processor of a computing system, the program code causes the computing system to perform operations. The operations include identifying metadata for a plurality of datasets. The operations further include generating a graph that connects the plurality of datasets according to a data lineage determined from the metadata. A composite score is generated for each node of the graph, wherein each node represents a respective dataset in the plurality of datasets. The graph is iteratively processed to generate a dataset rank for each dataset. The method additionally includes presenting the plurality of datasets, sorted according to the respective dataset rank of each dataset.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments of the disclosure implement a dataset rank metric to identify and rank datasets that are most relevant to a task. A graph of the different datasets within a company is established, linking the different datasets according to data lineage. the graph is weighted through use of factors like quality of data, reliability of the data producers, and popularity of the data being used. The weighted graph, in combination with search relevance depending on the task, can then be used to identify the most relevant datasets for the given task.

To implement the dataset rank algorithm, the system ingests datasets and maps the datasets to nodes and edges (or links) of a graph. The graph is a directed graph with edges that point in one direction between different nodes. The nodes of the graph represent the datasets. The edges represent the data lineage between datasets. The nodes and/or the edges may be weighted, as described further below.

After generating the graph, the dataset rank algorithm is applied to the graph to identify dataset ranks (i.e., measures of relevance) for the nodes of the graph. The dataset rank uses a combination of metrics to measure relevance. The dataset rank of a node may identify the relevance of the node as compared to the other nodes of the graph. Datasets that correspond to nodes with higher rankings are more relevant than datasets that correspond to nodes with lower rankings.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
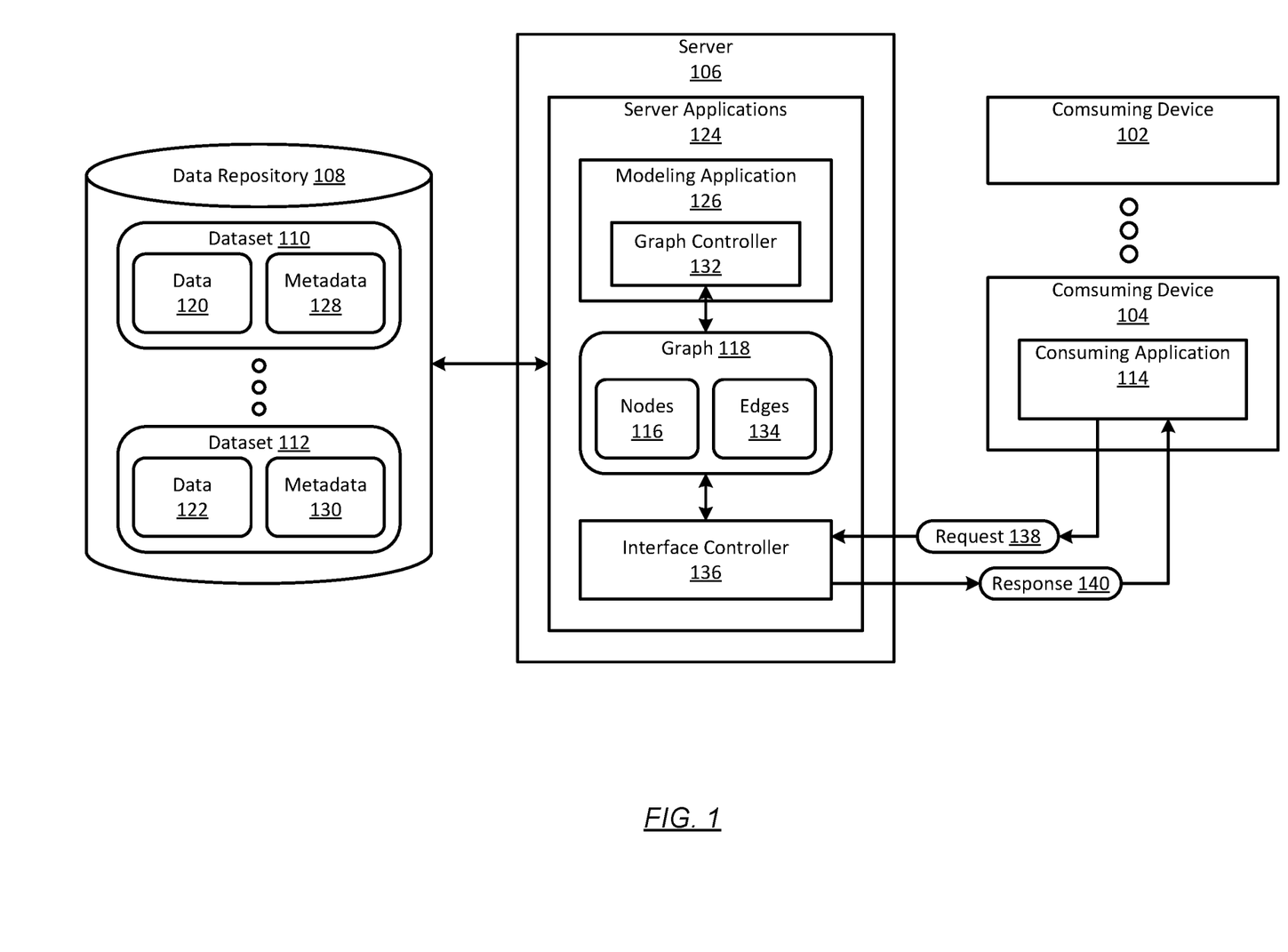
FIG. 1 is a system diagram in accordance with one or more embodiments.

Turning to FIG. 1, a diagram of a system is illustrated in accordance with one or more embodiments. As shown in FIG. 1, the system (100) includes a set of user devices (102, 104), and a server (106), which is connected to a data repository (108). The system (100) may be, for example, the computing system described below in reference to FIGS. 5A and 5B.

Figure 5A:
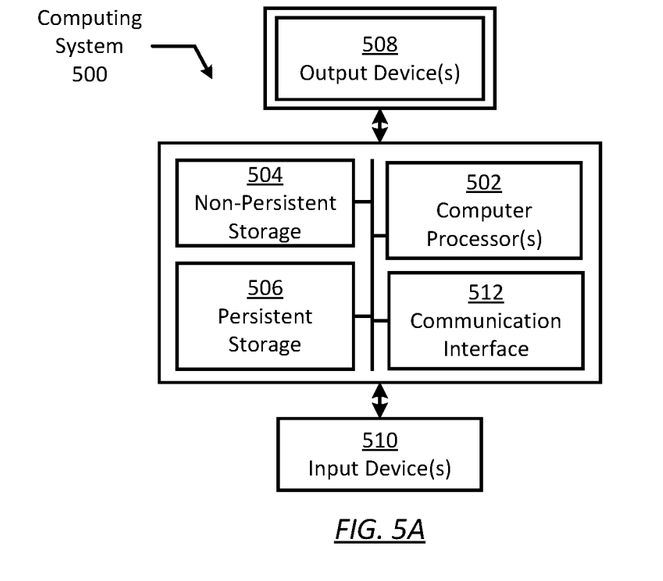
FIG. 5A and FIG. 5B show a computing system in accordance with one or more embodiments of the invention.

The user devices (102, 104) are computing systems (further described in FIG. 5A). For example, the user devices (102, 104) may be desktop computers, mobile devices, laptop computers, tablet computers, server computers, etc. The user devices (102, 104) include hardware components and software components that operate as part of the system (100). The user devices (102, 104) communicate with the server (106) to access, manipulate, and view information, including information stored in the one or more datasets (110, 112). The user devices (102, 104) may communicate with the server (106) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices (102, 104) may include one or more user applications, such as user application (114).

The user application (114) is one or more programs running on the user devices. The user application (114) may be native applications, web applications, embedded applications, etc. In one embodiment, the user application (114) includes web browser programs that display web pages from the server ((106). In one embodiment, the user application (114) provides graphical user interfaces that display information stored in datasets (110, 112) of the data repository (108).

As an example, the user application (114) may request a list of datasets sorted by relevance. The relevance may be identified by the dataset ranks of the corresponding nodes (116) from the graph (118). A list of datasets sorted by the dataset ranks may be received and displayed by the user application (114) to an operator of the user device (104).

As another example, the user device (104) may be used by a developer to maintain the software application hosted by the server (106). Developers may make updates to the data (120, 122) of the datasets (110, 112) to correct errors or modify the application served to the users of the system (100).

The server (106) is a computing system (further described in FIG. 5A). The server (106) may include multiple physical and virtual computing systems that form part of a cloud computing environment. In one embodiment, execution of the programs and applications of the server (106) is distributed to multiple physical and virtual computing systems in the cloud computing environment.

The server applications (124) is a collection of programs that may execute on multiple servers of a cloud environment, including the server (106). The server applications (124) include a modeling application (126) and an interface controller (136). Additionally, the server applications (124) may host websites accessed by users of the user devices (102, 104) to view information from the datasets (110, 112). The websites hosted by the server applications (124) may serve structured documents (hypertext markup language (HTML) pages, extensible markup language (XML) pages, JavaScript object notation (JSON) files and messages, etc., that incorporate data (120, 122).

The modeling application (126) is a collection of programs that may operate on the server (106). The modeling application (126) uses a graph controller (132) to generate the graph (118) from the metadata (128, 130) of datasets (110, 112). For the datasets (110, 112) in the data repository (108), the graph controller (132) identifies the nodes (116) and the edges (134) of the graph (118) according to the metadata (128, 130).

In one or more embodiments of the invention, the data repository (108) is any type of storage unit and/or device (e.g., a file system, database, data structure, or any other storage mechanism) for storing data. Further, the data repository (108) may include multiple different, potentially heterogeneous, storage units and/or devices.

The datasets (110, 112) are collections of data (120, 122). In the case of tabular data, a dataset corresponds to one or more database tables, where every column of a table represents a particular variable, and each row corresponds to a given record of the dataset. The dataset lists values for each of the variables, such as for example height and weight of an object, for each member of the dataset. The datasets (110, 112) can also consist of a collection of documents or files. The data repository (108) can include any number of datasets, which can be represented by:

$$D=\{d_1, d_2, \ldots, d_n\} \qquad \text{Equation 1}$$

wherein:

D is the total number of datasets $d_i$.

The metadata (128, 130) is data that describes data (120, 122). The metadata (128, 130) may be a structured text, such as JavaScript object notation (JSON) object, that identifies a data lineage of datasets (110, 112), which can include source, creator, transformations, and/or related datasets, etc.

As used herein, the term "data lineage" is metadata that describes where a dataset comes from and how the data therein was calculated. For example, when considering connections from one dataset to another, the datasets can share common columns, the datasets could be produced by the same entity, transformations of one dataset may be used to generate it another dataset, transformations of one dataset may generate another dataset, etc. These connections are stored as part of the metadata for the dataset, forming the data lineage of the dataset.

The graph (118) is generated from the metadata (128, 130) and includes the nodes (116) and the edges (134). The nodes (116) represent the different datasets (110, 112). The graph controller (132) generates a node for each dataset, and adds the node to the nodes (116) of the graph (118). In one embodiment, the graph controller (132) may generate the graph (118) "on demand" in response to receiving a request (138) from a user application (114).

The edges (134) identify pairs of datasets (represented by the nodes (116)) that are connected through a shared data lineage. The edges (134) are directed edges that connect pairs of nodes (116), according to the data lineage defined in metadata (128, 130). The graph controller (132) generates edges (134) between nodes (116 when processing the datasets (110, 112) of data repository (108).

The interface controller (136) is a collection of programs that may operate on the server (106). The interface controller (136) processes the request (138) using the graph (118) to generate the response (140).

Based on the graph (118), the response (140) is generated by the interface controller (136) in response to the request (138). In one embodiment, the response (140) includes a list of identifiers, of corresponding entities, that is sorted by the dataset ranks of the nodes (which correspond to the entities) of the graph (118). The response (140) may be a string of structured text (e.g., JSON (JavaScript object notation) text) that uses keys and values to specify the identifiers, entities, dataset ranks, nodes, etc. The response (140) may further include information from data (120, 122), which may be displayed to users of the user devices (102, 104).

Figure 2:
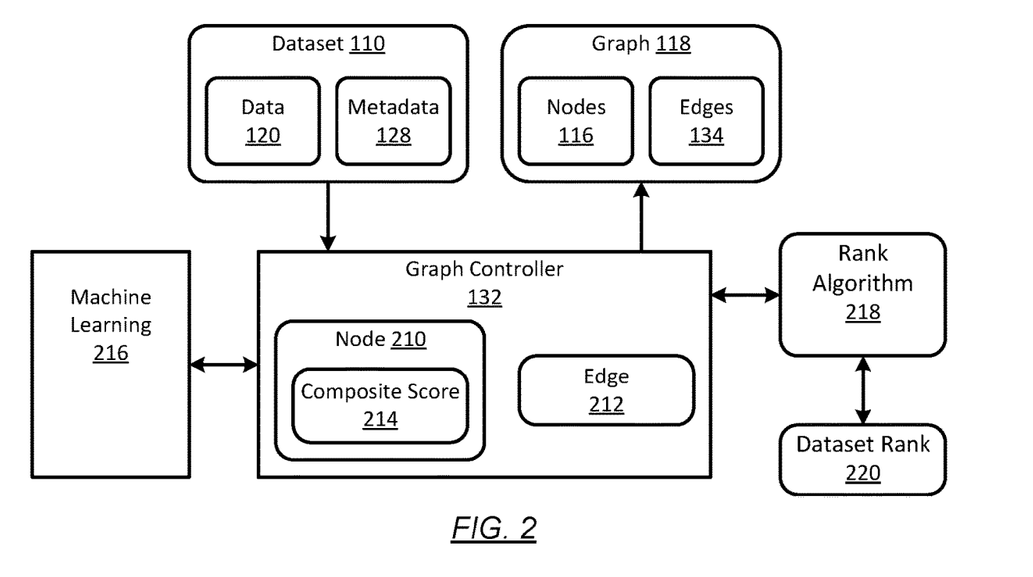
FIG. 2 and FIG. 3 show a flow diagram in accordance with one or more embodiments.

Turning to FIG. 2, node 210 is illustrated including composite score 214. Composite score 214 is an initial value based on one or more data metrics about the corresponding dataset. Composite score 214 is an initial value based on one or more data metrics about the corresponding dataset. For example, in one embodiment, composite score 214 can be determined according to Equation 2:

$$J(d_i) = Q(d_i) * P(d_i) * R(d_i) \qquad \text{Equation 2}$$

wherein:

$J(d_i)$ is the composite score for $d_i$;

$Q(d_i)$ is a data quality metric for $d_i$;

$P(d_i)$ is a data popularity metric for $d_i$; and $R(d_i)$ is a data reliability metric for $d_i$.

The data quality index $Q(d_i)$ is a value indicating the quality of data in a dataset. $Q(d_i)$ can be a normalized value between 0 and 1, based on the contents of the dataset (110), considering various dimensions of the data (120) such as completeness, accuracy, consistency, validity, uniqueness and/or integrity.

$$Q(d_i) = [0:1] \qquad \text{Equation 3}$$

In one embodiment, the graph controller (132) uses a machine learning model (216) to identify data quality index $Q(d_i)$ of dataset (110) from the data (120). The machine learning models may take data (120) as input and output a value representing data quality of the dataset (110). The models may include rules-based models and/or more sophisticated machine learning models, such as a neural network. The machine learning models may be updated by training, which may be supervised or semi-supervised training.

The data popularity metric $P(d_i)$ is value indicating the popularity of a dataset. $P(d_i)$ can be a normalized value between 0 and 1, based feedback received from a user.

$$P(d_i) = [0:1] \qquad \text{Equation 4}$$

For example, the $P(d_i)$ can be based on a normalized number of up/down votes (i.e., a sum total of up votes minus down votes) for the dataset. In the absence of feedback, $P(d_i)$ can alternatively be sum total of number of times a dataset has been used.

The data reliability metric $R(d_i)$ is value indicating the reliability of a producer of the dataset. $P(d_i)$ can be a normalized value between 0 and 1, based on data popularity metrics $P(d)$ of all datasets produced by the producer.

$$R(d_i) = [0:1] \qquad \text{Equation 5}$$

$$R(d_i) = \sum_{i \in B_j} \frac{P(d_i)_p}{n_p} \qquad \text{Equation 6}$$

wherein:

p is the producer of $d_i$; and n is the total number of datasets produced by p.

Taking the composite score (214) as an initial value, the rank algorithm (218) iteratively processes the graph to determine a dataset rank (220). For each node of the graph, the rank algorithm (218) identifies relevance of a corresponding dataset.

Figure 3:
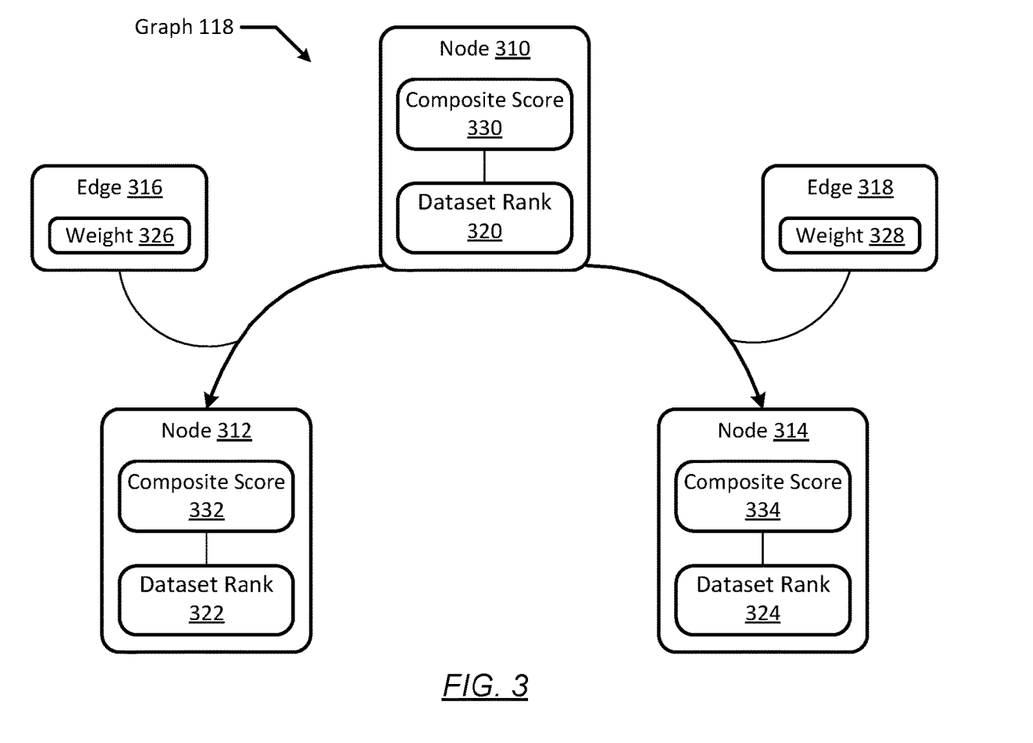

Turning to FIG. 3, the nodes (310, 312, 314) are part of the nodes (116) (of FIG. 1) of the graph (118). The edges (316, 318) are part of the edges (134) of the graph (118). The edge (316) connects the node (310) and node (312), and represents a data lineage between the corresponding datasets of nodes (310) and node (312). The edge (318) connects the node (310) and node (314), and represents a data lineage between the corresponding datasets of nodes (310) and node (314).

The nodes (310, 312, 314) respectively include the dataset ranks (320, 322, 324). The dataset ranks (320, 322, 324) are generated using the rank algorithm (218) (of FIG. 2). The rank algorithm (218) identifies an amount of relevance of the datasets represented by the nodes of the graph.

The edges (316, 318) represent data lineage between nodes (310, 312) and nodes (310, 314), respectively. In some embodiments, the edges (316, 318) respectively can include the weights (326, 328).

The weights (326, 328) represent the values of data lineage connections between nodes (310, 312) and nodes (310, 314), respectively. In one embodiment, the weights (326, 328) may be set to 1. In one embodiment, the weights (326, 328) may be set to a number of data lineage connections represented by the respective edges (316, 318). In one embodiment, the weights (326, 328) may represent a combination (e.g., the sum) of connections between the datasets represented by the respective edges (316, 318).

for a particular dataset, the dataset rank value is dependent upon dataset ranks for each dataset linking to the particular dataset, as well as the number of datasets which the particular dataset links to. For example, dataset ranks (324, 324) depend upon dataset rank (320). dataset ranks (320) is dependent upon the total number (2 in this example) of edges from node (210). In other words, the dataset rank DR for dataset $d_i$ is generated in accordance with Equation 7:

$$DR(d_i) = \sum_{v \in B_i} \frac{DR(v)}{L(v)} \qquad \text{Equation 7}$$

wherein:

$B_i$ is the set containing all datasets linking to $d_i$;

v is a dataset in $B_i$; and

L is the number of links from $d_i$.

Starting from composite scores (330, 332, 334), dataset ranks for each of the nodes are iteratively determined. In one iteration, the dataset ranks for each of the nodes (310, 312, 314) are calculated. Multiple iterations may be performed, with each subsequent iteration taking the previously determined dataset rank as input. The iterations may continue until a criterion is satisfied, e.g., when the sum of each change of each dataset rank is below a value of a change threshold.

While FIG. 1, FIG. 2, and FIG. 3 show a configuration of components, other configurations may be used without departing from the scope of the invention. For example, various components may be combined to create a single component. As another example, the functionality performed by a single component may be performed by two or more components.

Figure 4:
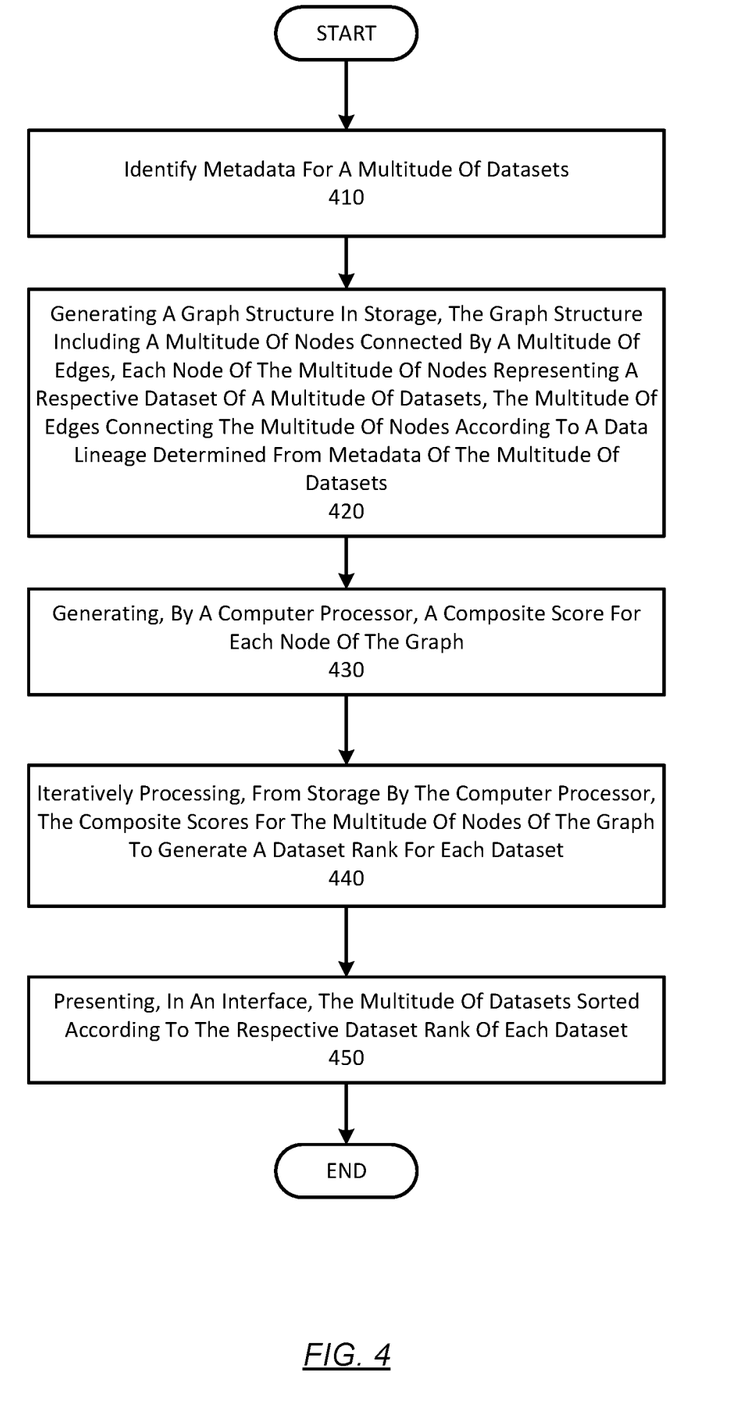
FIG. 4 shows a flowchart of a method to rank datasets in accordance with one or more embodiments

Turning to FIG. 4, the process (400) implements a dataset rank metric of determining dataset relevance. The process (400) may be performed by a server.

In block 410, metadata is identified for a plurality of datasets. The metadata may be a structured text, such as a JSON object. The data lineage can include information about the dataset, including source, creator, transformations, and/or related datasets, etc.

In block 420, a graph structure is generated in storage. The graph structure comprising a plurality of nodes connected by a plurality of edges. Each node of the plurality of nodes represent a respective dataset of a plurality of datasets. The plurality of edges connect the plurality of nodes according to a data lineage determined from metadata of the plurality of datasets.

In block 430, a computer processor generates a composite score for each node of the graph. The composite score is an initial value representing data relevance, determined from various data metrics about the corresponding dataset. These metrics are then combined, such as a product or sum, to determine the node's composite score In some embodiments, generating the composite score further comprises for each node of the graph, determining a data quality index $Q(d_i)$, a data popularity index $P(d_i)$, and a data reliability index $R(d_i)$. For each for each node of the graph, the respective indices are combined to generate the composite score $J(d_i)$ for the respective node.

In some embodiments, the data quality index $Q(d_i)$ can be determined by processing the dataset with a machine learning algorithm. The machine learning algorithm can be trained from a plurality of training datasets. For each for each node of the graph, the data quality index $Q(d_i)$ of the dataset is predicted according to output from the machine learning algorithm.

In some embodiments, the data popularity index $P(d_i)$ is determined for each for each node of the graph by identifying values for user ratings. These readings can be a number of positive or negative feedbacks received from users regarding the dataset. The ratings can be recorded in, and identified from, the metadata for the dataset. For each for each node of the graph, the values are summed, and optionally normalized, to determine the popularity index.

In some embodiments, the data popularity index $P(d_i)$ is a number of directed edges from the respective node. The directed edges can be used, for example, when user ratings are unavailable.

At block 440, the computer processor iteratively processes, from storage, the composite scores for the plurality of nodes of the graph to generate a dataset rank for each dataset. The dataset rank is a measure of relevance of the corresponding dataset.

In some embodiments, iteratively processing the graph further comprises setting the plurality of dataset ranks to a plurality of composite score values; and repeatedly updating the plurality of dataset ranks until a change threshold is met.

In some embodiments, the graph is iteratively processed by processing the plurality of dataset ranks. The plurality of dataset ranks is set to a plurality of initial rank values, which can be the corresponding composite scores. A plurality of subsequent ranks are then generated using the plurality of dataset ranks, and the plurality of dataset ranks is set to the plurality of subsequent ranks. The plurality of subsequent ranks are repeatedly generated, and the plurality of dataset ranks are repeatedly set to the plurality of subsequent ranks, until a change threshold is met.

At block 450, the plurality of datasets are presented in an interface, sorted according to the respective dataset rank of each dataset. The interface can be any of multiple interfaces (e.g., graphical user interfaces, application programming interfaces (API), etc.) for interacting with one or more different server or client applications.

In some embodiments, the method may additionally include responding to requests for data, such as the structured query language (SQL) request. In response to receiving a request to identify a subset of the plurality of datasets. The graph is recursively processed relative to the request to generate the dataset rank. The plurality of datasets are then presented in a response, sorted according to the respective dataset rank.

While the various steps in this flowchart are presented and described sequentially, at least some of the steps may be executed in different orders, may be combined, or omitted, and at least some of the steps may be executed in parallel. Furthermore, the steps may be performed actively or passively.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. The following example is for explanatory purposes only and not intended to limit the scope of the invention.

For example, as shown in FIG. 5A, the computing system (500) may include one or more computer processors (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing unit (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 5B:
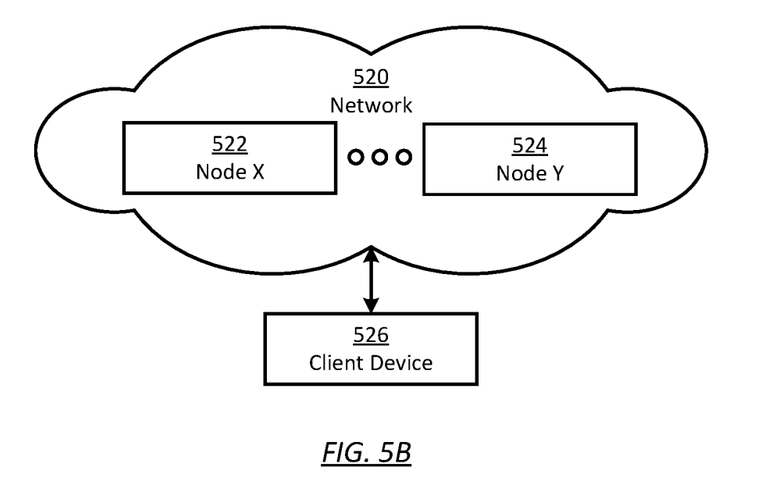

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments of the invention.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and." Further, items joined by the term "or" may include any combination of the items with any number of each item unless, expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    identifying metadata for a plurality of datasets;
    generating a graph structure in storage, the graph structure comprising a plurality of nodes connected by a plurality of edges, each node of the plurality of nodes representing a respective dataset of the plurality of datasets, the plurality of edges connecting the plurality of nodes according to a data lineage determined from metadata of the plurality of datasets;

generating, by a computer processor, a composite score for each node of the plurality of nodes of the graph structure to generate a plurality of composite scores;

processing, from a storage by the computer processor, the plurality of composite scores for the plurality of nodes of the graph structure to generate a respective dataset rank for each dataset in the plurality of datasets, wherein processing the plurality of composite scores comprises:

setting the respective dataset rank based on the composite score for the each node of the plurality of nodes;

recursively updating the respective dataset rank of each dataset based on (i) dataset ranks for linked datasets, the linked datasets corresponding to a subset of the plurality of nodes that are directly connected to a node of the plurality of nodes, and further based on (ii) a number of datasets to which the each dataset is linked, wherein:

the dataset ranks comprise the respective dataset rank for each of the linked datasets, after updating an initial dataset rank, during each subsequent updating of recursively updating the respective dataset rank, using a previously determined dataset rank as input, and updating continues until a sum of changes of the dataset ranks is below a change threshold;

sorting the plurality of datasets according to the respective dataset rank of the each dataset; and presenting, in an interface, the plurality of datasets sorted according to the respective dataset rank of the each dataset.

2. The method of claim 1, wherein generating the composite score further comprises:

for each node of the graph structure, determining a data quality index, a data popularity index, and a data reliability index; and for the each node of the graph structure, combining respective indices to generate the composite score for the respective node.

3. The method of claim 2, wherein determining the data quality index further comprises:

for the each node of the graph structure, processing the respective dataset with a machine learning algorithm trained from a plurality of training datasets; and for the each node of the graph structure, predicting the data quality index of the respective dataset according to output from the machine learning algorithm.

4. The method of claim 2, wherein determining the data popularity index further comprises:

for the each node of the graph structure, identifying values for user ratings from the metadata for the respective dataset; and for the each node of the graph structure, summing the values to determine the popularity index.

5. The method of claim 2, wherein the data popularity index is a second number of outdegree edges from the respective node.

6. The method of claim 1, wherein iteratively processing the graph structure further comprises:

setting the respective dataset rank to a composite score value.

7. The method of claim 1, wherein iteratively processing the graph structure further comprises:

processing the respective dataset rank by:

setting the respective dataset rank to an initial rank value;

generating a subsequent respective rank using the respective dataset rank;

setting the respective dataset rank to the subsequent respective rank.

8. The method of claim 1, further comprising:

processing a request to identify a second subset of the plurality of datasets;

wherein processing the graph structure further comprises recursively processing the graph structure relative to the request to generate the respective dataset rank; and wherein presenting the plurality of datasets further comprises presenting only the second subset of the plurality of datasets, sorted according to the respective dataset rank.

9. A system comprising:

a processor;

a non-transitory computer readable storage medium in communication with the processor and storing program code comprising:

a graph controller configured, when executed by the processor, to process a plurality of datasets;

an interface controller configured, when executed by the processor, to generate a response comprising a plurality of dataset identifiers;

a modeling application which, when executed by the processor, is configured for:

identifying metadata for the plurality of datasets;

generating a graph structure comprising a plurality of nodes connected by a plurality of edges, each node of the plurality of nodes representing a respective dataset of the plurality of datasets, the plurality of edges connecting the plurality of nodes according to a data lineage determined from metadata of the plurality of datasets;

generating a composite score for each node of the plurality of nodes of the graph structure to generate a plurality of composite scores; and processing the plurality of composite scores for the plurality of nodes of the graph structure to generate a respective dataset rank for each dataset in the plurality of datasets, wherein processing the plurality of composite scores comprises:

setting the respective dataset rank based on the composite score for the each node of the plurality of nodes;

recursively updating the respective dataset rank of each dataset based on (i) dataset ranks for linked datasets, the linked datasets corresponding to a subset of the plurality of nodes that are directly connected to a node of the plurality of nodes, and further based on (ii) a number of datasets to which the each dataset is linked, wherein:

the dataset ranks comprise the respective dataset rank for each of the linked datasets, after updating an initial dataset rank, during each subsequent updating of recursively updating the respective dataset rank, using a previously determined dataset rank as input, and updating continues until a sum of changes of the dataset ranks is below a change threshold;

sorting the plurality of datasets according to the respective dataset rank of the each dataset; and a server application which, when executed by the processor, is configured for:

presenting the plurality of datasets, sorted according to the respective dataset rank of the each dataset.

10. The system of claim 9, wherein generating the composite score further comprises:
for the each node of the graph structure, determining a data quality index, a data popularity index, and a data reliability index; and
for the each node of the graph structure, combining respective indices to generate the composite score for the respective node.

11. The system of claim 10, wherein determining the data quality index further comprises:
for the each node of the graph structure, processing the plurality of datasets with a machine learning algorithm trained from a plurality of training datasets; and
for the each node of the graph structure, predicting the data quality index of the plurality of datasets according to output from the machine learning algorithm.

12. The system of claim 10, wherein determining the data popularity index further comprises:
for the each node of the graph structure, identifying values for user ratings from the metadata for the plurality of datasets; and
for the each node of the graph structure, summing the values to determine the data popularity index.

13. The system of claim 10, wherein the data popularity index is a second number of outdegree edges from the respective node.

14. The system of claim 9, wherein recursively processing the graph structure further comprises:
setting the respective dataset rank to an initial dataset rank value;
updating a plurality of edge values, of the plurality of edges, using the respective dataset rank;
updating the respective dataset rank using the plurality of edge values.

15. The system of claim 9, wherein recursively processing the graph structure further comprises:
processing the respective dataset rank by:
setting the respective dataset rank to an initial dataset rank value;
generating subsequent respective dataset rank using the respective dataset rank value;
setting the respective dataset rank to the subsequent respective dataset rank.

16. The system of claim 9, further comprising:
program code for processing a request to identify a second subset of the plurality of datasets,
wherein processing the graph structure further comprises recursively processing the graph structure relative to the request to generate the respective dataset rank; and
wherein presenting the plurality of datasets further comprises presenting only the second subset of the plurality of datasets, sorted according to the respective dataset rank.

17. A computer program product comprising non-transitory computer-readable storage medium having program code stored thereon that, when executed by a computer processor of a computing system, causes the computing system to perform operations comprising:
identifying metadata for a plurality of datasets;
generating a graph structure in storage, the graph structure comprising a plurality of nodes connected by a plurality of edges, each node of the plurality of nodes representing a respective dataset of the plurality of datasets, the plurality of edges connecting the plurality of nodes according to a data lineage determined from metadata of the plurality of datasets;
generating a composite score for each node of the plurality of nodes of the graph structure to generate a plurality of composite scores;
processing, from a storage by the computer processor, the plurality of composite scores for the plurality of nodes of the graph structure to generate a respective dataset rank for each dataset in the plurality of datasets, wherein processing the plurality of composite scores comprises:
setting the respective dataset rank based on the composite score for the each node of the plurality of nodes;
recursively updating the respective dataset rank of each dataset based on (i) dataset ranks for linked datasets, the linked datasets corresponding to a subset of the plurality of nodes that are directly connected to a node of the plurality of nodes, and further based on (ii) a number of datasets to which the each dataset is linked, wherein:
the dataset ranks comprise the respective dataset rank for each of the linked datasets,
after updating an initial dataset rank, during each subsequent updating of recursively updating the respective dataset rank, using a previously determined dataset rank as input, and
updating continues until a sum of changes of the dataset ranks is below a change threshold;
sorting the plurality of datasets according to the respective dataset rank of the each dataset; and
presenting, in an interface, the plurality of datasets sorted according to the respective dataset rank of the each dataset.

18. The computer program product of claim 17, wherein generating the composite score further comprises:
for the each node of the graph structure, determining a data quality index, a data popularity index, and a data reliability index; and
for the each node of the graph structure, combining respective indices to generate the composite score for the respective node.

19. The computer program product of claim 18, wherein determining the data quality index further comprises:
for the each node of the graph structure, processing the respective dataset with a machine learning algorithm trained from a plurality of training datasets; and
for the each node of the graph structure, predicting the data quality index of the respective dataset according to output from the machine learning algorithm.

20. The computer program product of claim 18, wherein determining the data popularity index further comprises:
for the each node of the graph structure, identifying values for user ratings from the metadata for the respective dataset; and
for the each node of the graph structure, summing the values to determine the popularity index.

* * * * *